United States Patent
Skalski

(10) Patent No.: US 10,717,401 B2
(45) Date of Patent: Jul. 21, 2020

(54) TERMINAL BLOCK ASSEMBLY FOR ELECTRIFIED VEHICLES

(71) Applicant: FORD GLOBAL TECHNOLOGIES, LLC, Dearborn, MI (US)

(72) Inventor: Vincent T. Skalski, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 419 days.

(21) Appl. No.: 15/493,711

(22) Filed: Apr. 21, 2017

(65) Prior Publication Data

US 2018/0304835 A1  Oct. 25, 2018

(51) Int. Cl.

| | |
|---|---|
| *B60R 16/03* | (2006.01) |
| *B60L 50/51* | (2019.01) |
| *H02K 11/33* | (2016.01) |
| *H01R 13/52* | (2006.01) |
| *H02K 5/10* | (2006.01) |
| *H01R 9/24* | (2006.01) |
| *H02K 5/22* | (2006.01) |

(52) U.S. Cl.
CPC .............. *B60R 16/03* (2013.01); *B60L 50/51* (2019.02); *H01R 13/5219* (2013.01); *H02K 5/10* (2013.01); *H02K 5/225* (2013.01); *H02K 11/33* (2016.01); *B60L 2220/00* (2013.01); *H01R 9/24* (2013.01); *H01R 2201/10* (2013.01)

(58) Field of Classification Search
CPC .............. H01R 9/2458; H01R 9/2491; H01R 13/5202; B60L 2220/00
USPC .......................................................... 310/71
See application file for complete search history.

(56) References Cited

U.S. PATENT DOCUMENTS

| | | | |
|---|---|---|---|
| 6,160,696 A | 12/2000 | Bailey et al. | |
| 7,952,875 B2 | 5/2011 | Woody et al. | |
| 8,253,020 B2 | 8/2012 | Niwa et al. | |
| 9,308,877 B2 | 4/2016 | Shiba | |
| 2007/0046223 A1 | 3/2007 | Korich et al. | |
| 2007/0046224 A1 | 3/2007 | Korich et al. | |
| 2010/0139896 A1* | 6/2010 | Chamberlin ........... | H02K 5/225 165/104.33 |
| 2011/0316373 A1* | 12/2011 | Kobayashi ............... | H01R 9/24 310/71 |
| 2012/0286593 A1* | 11/2012 | Yokogawa ............. | H02K 1/278 310/43 |
| 2013/0214593 A1* | 8/2013 | Ohashi .................... | B60R 16/03 307/10.1 |
| 2014/0113472 A1* | 4/2014 | Chamberlin ............. | H02K 3/50 439/212 |
| 2014/0218865 A1 | 8/2014 | Wagner et al. | |

(Continued)

FOREIGN PATENT DOCUMENTS

| | | |
|---|---|---|
| JP | 2007166803 A | 6/2007 |
| WO | 2006/030732 A1 | 3/2006 |

*Primary Examiner* — Quyen P Leung
*Assistant Examiner* — Robert E Mates
(74) *Attorney, Agent, or Firm* — David B. Kelly; Carlson, Gaskey & Olds

(57) ABSTRACT

An electrified vehicle includes a first electrical component, a second electrical component, and a terminal block assembly adapted to electrically couple the first electric component to the second electrical component. The terminal block assembly includes a housing, a bus bar, and a first seal adapted to seal the second electrical component from a wet environment of the first electrical component.

2 Claims, 9 Drawing Sheets

(56) References Cited

U.S. PATENT DOCUMENTS

| | | | |
|---|---|---|---|
| 2014/0239758 A1* | 8/2014 | Nagao | H02K 5/225 |
| | | | 310/71 |
| 2015/0061422 A1* | 3/2015 | Nagao | H02P 25/22 |
| | | | 310/52 |
| 2015/0061423 A1* | 3/2015 | Nagao | H02K 5/225 |
| | | | 310/52 |
| 2015/0083505 A1 | 3/2015 | Pearch, Jr. et al. | |
| 2015/0236625 A1* | 8/2015 | Cho | H02P 21/22 |
| | | | 318/400.15 |
| 2016/0020680 A1* | 1/2016 | Hattori | H05K 7/1432 |
| | | | 310/72 |
| 2017/0003323 A1 | 1/2017 | Nakayama et al. | |

* cited by examiner

AREA A

TERMINAL BLOCK ASSEMBLY FOR ELECTRIFIED VEHICLES

TECHNICAL FIELD

This disclosure relates to electrified vehicles. An exemplary electrified vehicle includes a terminal block assembly adapted to electrically couple first and second electrical components of the electrified vehicle.

BACKGROUND

The desire to reduce automotive fuel consumption and emissions has been well documented. Electrified vehicles are being developed for reducing or completely eliminating reliance on internal combustion engines. In general, electrified vehicles differ from conventional motor vehicles because they are selectively driven by one or more battery powered electric motors. Conventional motor vehicles, by contrast, rely exclusively on the internal combustion engine to drive the vehicle.

A high voltage battery pack typically powers the electric motor of the electrified vehicle. An inverter converts direct current (DC) power from the high voltage battery pack to alternating current (AC) power for driving the electric motor. A bus bar assembly electrically couples the inverter to the electric motor for outputting AC power to the electric motor. Establishing reliable electrical connections between components operating on heavy electrical currents can be challenging.

SUMMARY

An electrified vehicle according to an exemplary aspect of the present disclosure includes, among other things, a first electrical component, a second electrical component, and a terminal block assembly adapted to electrically couple the first electric component to the second electrical component. The terminal block assembly includes a housing, a bus bar, and a first seal adapted to seal the second electrical component from a wet environment of the first electrical component.

In a further non-limiting embodiment of the foregoing electrified vehicle, the first electrical component is an electric motor and the second electrical component is an inverter system.

In a further non-limiting embodiment of either of the foregoing electrified vehicles, a second seal is received around the bus bar.

In a further non-limiting embodiment of any of the foregoing electrified vehicles, the second seal is trapped between a sealing surface of the housing and the first seal.

In a further non-limiting embodiment of any of the foregoing electrified vehicles, the first seal is received within a recessed groove formed in the housing.

In a further non-limiting embodiment of any of the foregoing electrified vehicles, the housing includes at least one mounting tab for mounting the terminal block assembly to either the first electrical component or the second electrical component.

In a further non-limiting embodiment of any of the foregoing electrified vehicles, the first electrical component is an electric motor and the housing is mounted to a mounting flange of the electric motor.

In a further non-limiting embodiment of any of the foregoing electrified vehicles, the housing includes a first housing section extending along a first longitudinal axis and a second housing section extending along a second longitudinal axis.

In a further non-limiting embodiment of any of the foregoing electrified vehicles, the first longitudinal axis is transverse to the second longitudinal axis.

In a further non-limiting embodiment of any of the foregoing electrified vehicles, the bus bar includes a first section extending in parallel with the first longitudinal axis, a second section that protrudes outside of the first housing section and is perpendicular to the first longitudinal axis, a third section that extends in parallel with the second longitudinal axis, and a fourth section that protrudes outside of the second housing section and is perpendicular to the second longitudinal axis.

In a further non-limiting embodiment of any of the foregoing electrified vehicles, the second section connects to the first electrical component and the fourth section connects to the second electrical component.

In a further non-limiting embodiment of any of the foregoing electrified vehicles, the second section connects to a motor stator lead of the first electrical component and the fourth section connects to a current sensor of the second electrical component.

In a further non-limiting embodiment of any of the foregoing electrified vehicles, the bus bar includes at least one bend to establish a circuitous route inside the housing.

In a further non-limiting embodiment of any of the foregoing electrified vehicles, the housing is overmolded around the bus bar.

In a further non-limiting embodiment of any of the foregoing electrified vehicles, the bus bar is snap-fit into the housing.

A method according to another exemplary aspect of the present disclosure includes, among other things, electrically coupling a first electrical component to a second electrical component of an electrified vehicle using a terminal block assembly that includes a housing, a plurality of bus bars, and a first seal. Fluids are blocked from moving from a wet environment of the first electrical component toward a dry environment of the second electrical component by the first seal.

In a further non-limiting embodiment of the foregoing method, the first electrical component is an electric motor and the second electrical component is an inverter system of the electrified vehicle.

In a further non-limiting embodiment of either of the foregoing methods, the terminal block assembly includes at least one second seal, and wherein the first seal and the at least one second seal cooperate to block the fluids.

In a further non-limiting embodiment of any of the foregoing methods, the method includes arranging end portions of the plurality of bus bars such that the end portions are arranged in a horizontal row when mounted.

In a further non-limiting embodiment of any of the foregoing methods, the method includes arranging end portions of the plurality of bus bars such that the end portions are arranged in a vertical row when mounted.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details power systems for electrically coupling components of electrified vehicles. An exemplary electrified vehicle includes a first electrical component (e.g., an electric motor), a second electrical component (e.g., an inverter system), and a terminal block assembly adapted to electrically couple the first and second electrical components. The terminal block assembly includes a housing, a bus bar, and a seal. The seal is adapted to seal the second electrical component from a wet environment of the first electrical component. These and other features of this disclosure are described in greater detail below.

Figure 1:
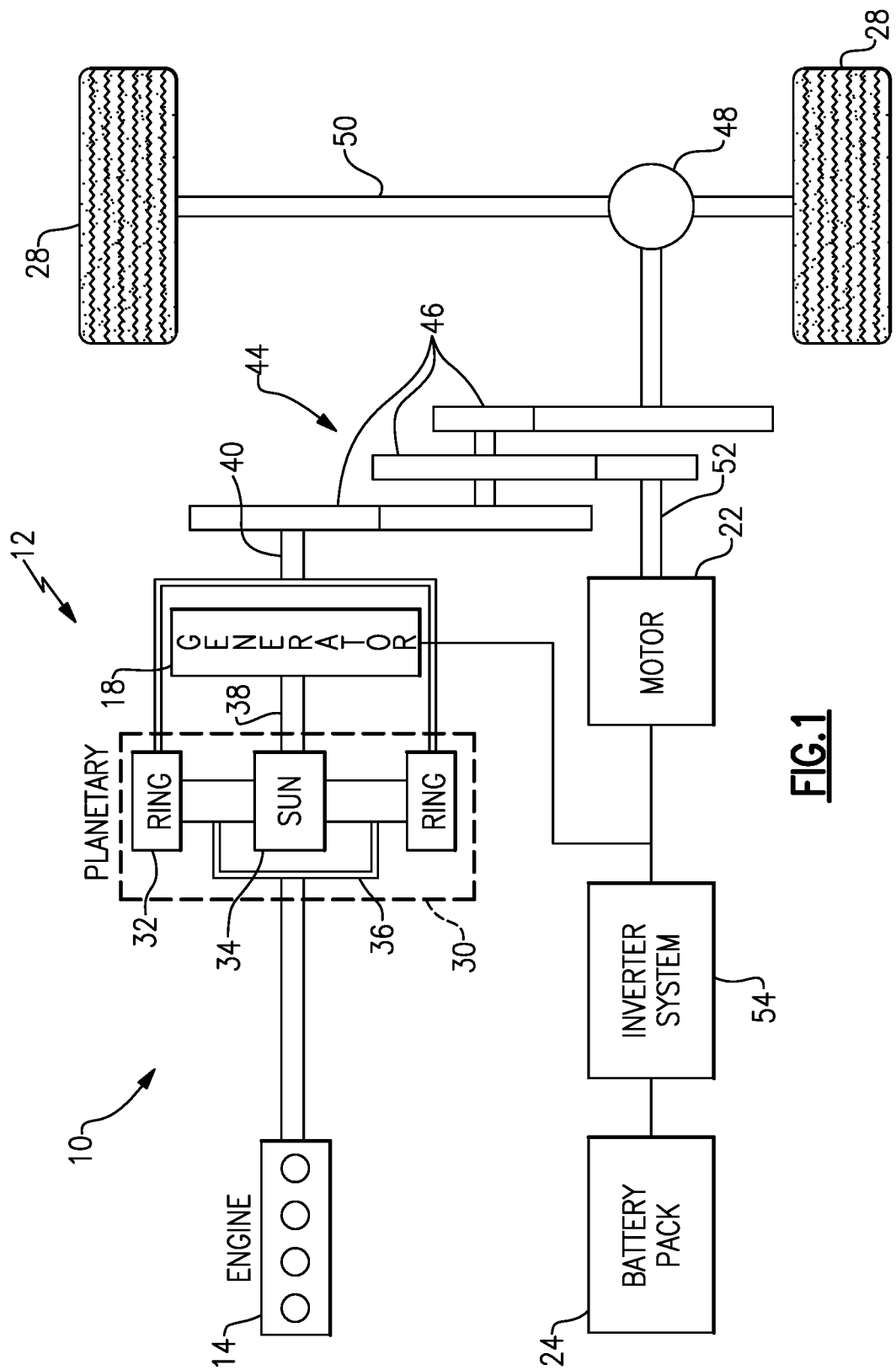
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least an electric motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The electric motor 22 can also be employed to drive the vehicle drive wheels 28 by outputting torque to a shaft 52 that is also connected to the second power transfer unit 44. In a non-limiting embodiment, the electric motor 22 and the generator 18 cooperate as part of a regenerative braking system in which both the electric motor 22 and the generator 18 can be employed as motors to output torque. For example, the electric motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric motor 22, the generator 18 and/or other electrical loads of the electrified vehicle 12. Other types of energy storage devices and/or output devices could also be used to electrically power the electrified vehicle 12.

The powertrain 10 of the electrified vehicle 12 may additionally include an inverter system 54, which may also be referred to as an inverter system controller (ISC). The inverter system 54 is adapted to support bidirectional power flow through the powertrain 10. For example, the inverter system 54 converts DC power derived from the battery pack 24 to AC power for driving the electric motor 22 and/or the generator 18. In a non-limiting embodiment, the inverter system 54 is an inverter system controller combined with a variable voltage converter (ISC/VVC).

In a non-limiting embodiment, the electrified vehicle 12 has two basic operating modes. The electrified vehicle 12 may operate in an Electric Vehicle (EV) mode where the electric motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the electric motor 22 are both used for vehicle propulsion. The HEV mode is an example of a charge sustaining mode of operation for the electrified vehicle 12. During the HEV mode, the electrified vehicle 12 may reduce the electric motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
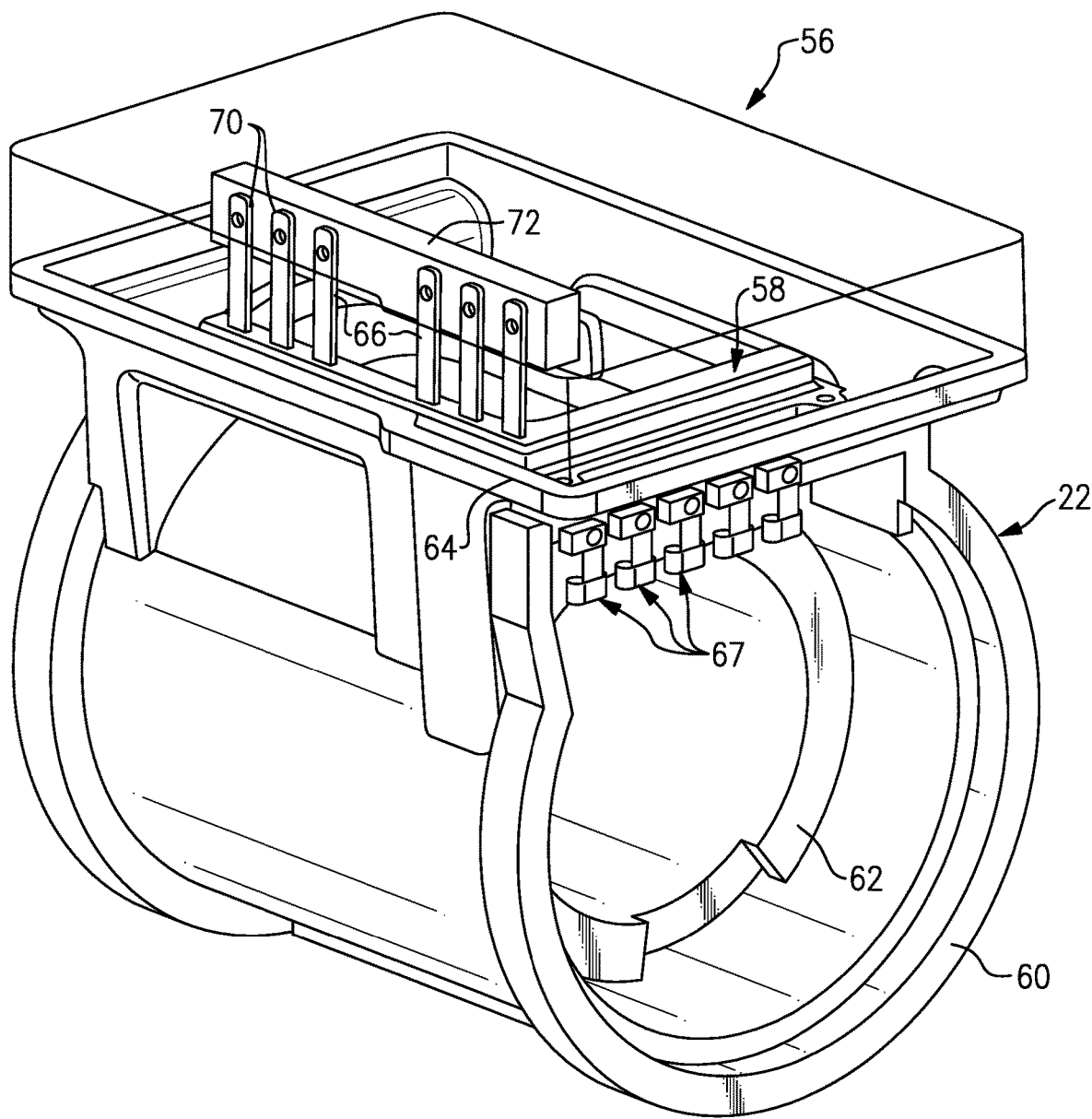
FIG. 2 illustrates a power system of an electrified vehicle.
Figure 3:
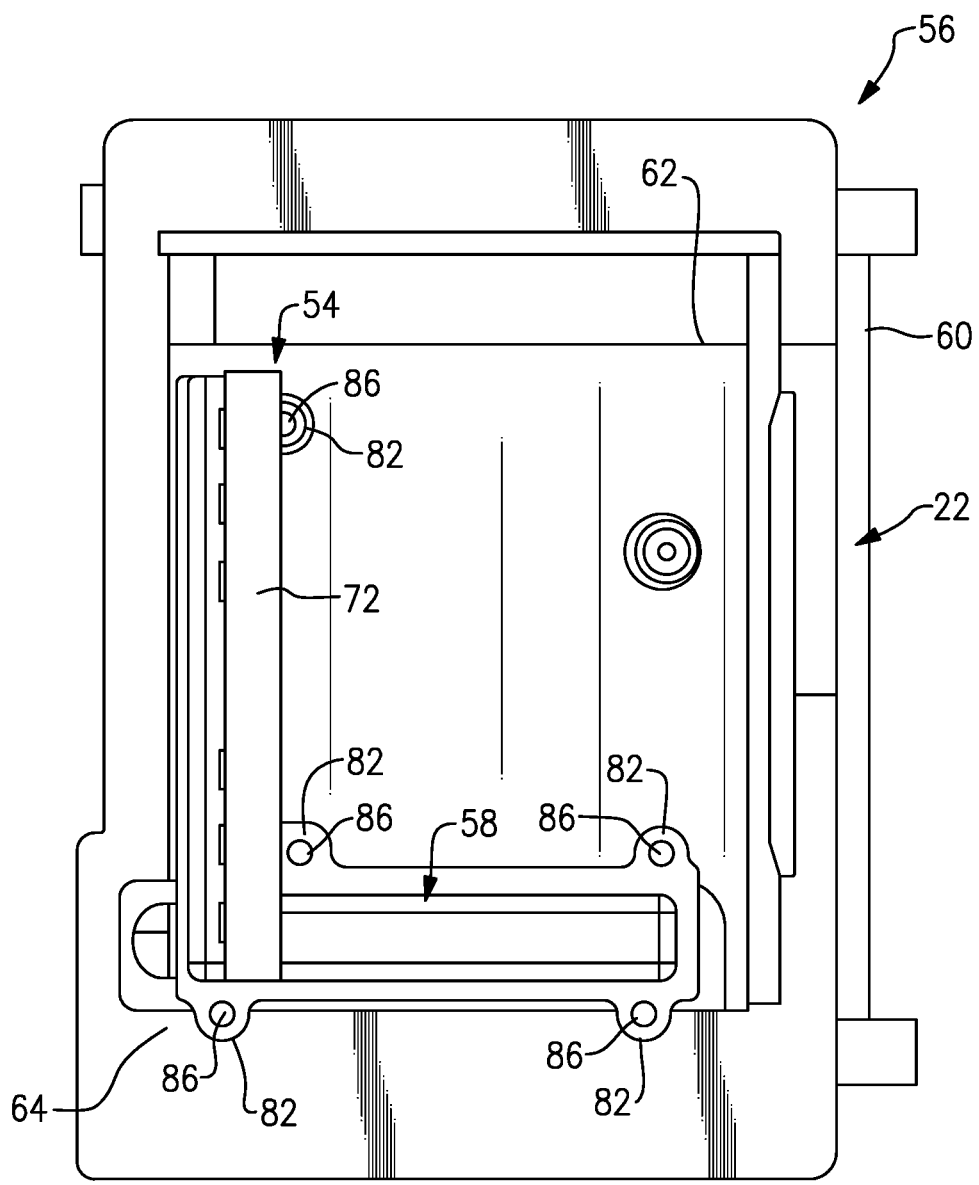
FIG. 3 is a top view of the power system of FIG. 2.
Figure 4:
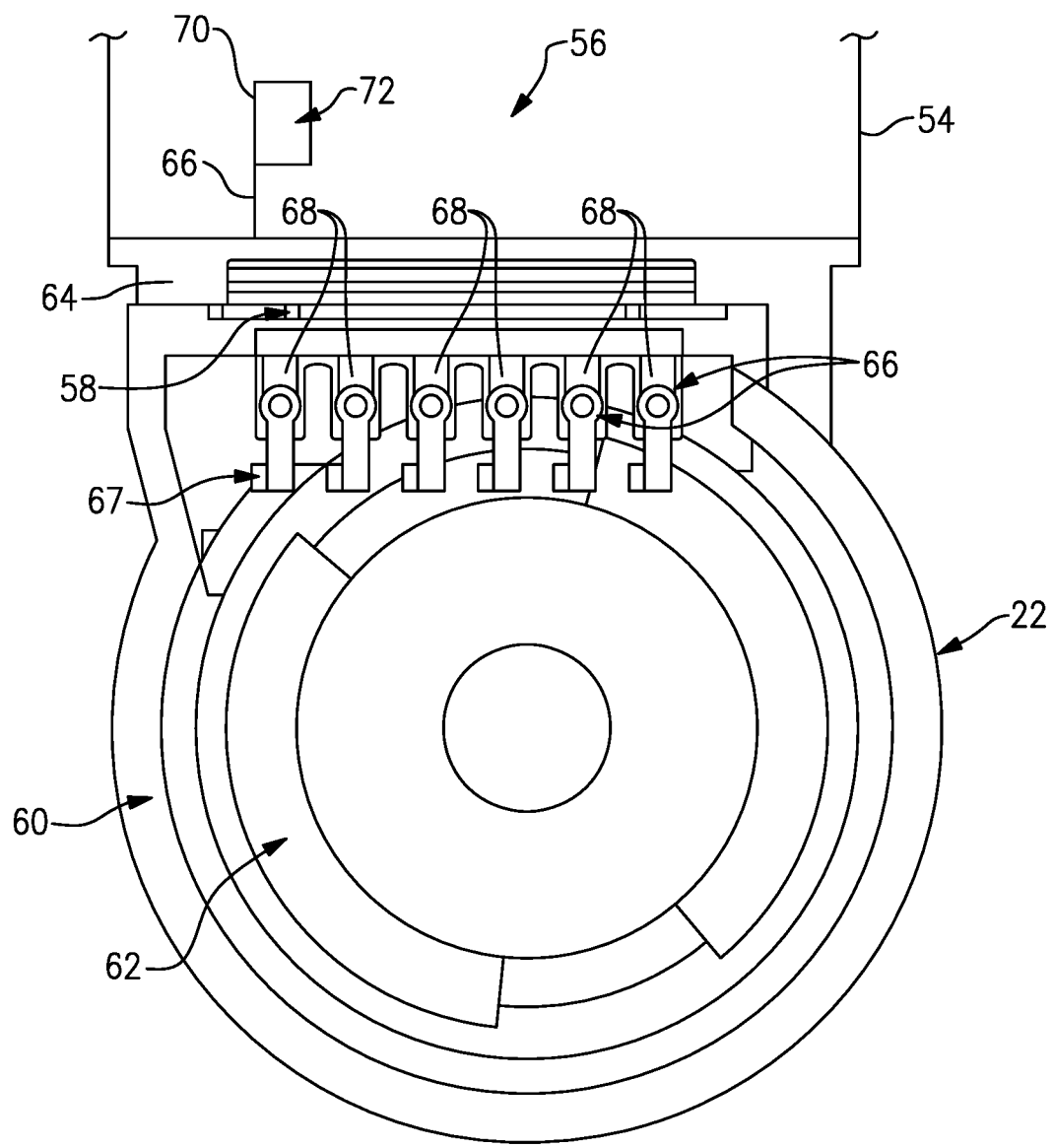
FIG. 4 is a side view of the power system of FIG. 2.

FIGS. 2, 3, and 4 schematically illustrate a power system 56 that can be employed within an electrified vehicle. For example, the power system 56 could be part of the powertrain 10 of the electrified vehicle 12 of FIG. 1.

In an exemplary, non-limiting embodiment, the power system 56 includes an electric motor 22 (i.e., a first electrical component), an inverter system 54 (i.e., a second electrical component), and a terminal block assembly 58. The terminal block assembly 58 electrically couples the electric motor 22 to the inverter system 54 in order to output AC power for driving the electric motor 22. For example, the inverter system 54 may receive DC power from the battery pack 24 (see FIG. 1), and may convert this DC power to three-phase AC power. The AC power is carried to the electric motor 22 by the terminal block assembly 58 for driving the electric motor 22.

This disclosure describes electrically coupling an electric motor and an inverter system as non-limiting examples. However, the terminal block assemblies of this disclosure could be used to electrically couple any electrified vehicle components that operate over an alternating current bus.

The electric motor 22 includes a motor housing 60 that houses a motor stator 62. The motor stator 62 operates in a wet environment, and the inverter system 54 operates in a dry environment. The terminal block assembly 58 may be mounted to a surface 64 of the motor housing 60 for sealing the wet environment of the motor stator 62 from the dry inverter system 54. In a non-limiting embodiment, the surface 64 is a mounting flange of the motor housing 60.

The terminal block assembly 58 includes a plurality of bus bars 66 for electrically coupling the inverter system 54 and the electric motor 22. In this example, the terminal block assembly 58 include six total bus bars 66. However, the total number of bus bars 66 is not intended to limit this disclosure, and thus a greater or fewer number of bus bars than are shown in the figures associated with this disclosure could be employed within the terminal block assembly 58.

In a non-limiting embodiment, the bus bars 66 are made of copper. However, other materials may also be suitable. Motor stator leads 67, which are connected to windings of the motor stator 62, are connected to first end portions 68 of the bus bars 66, and second, opposite end portions 70 of the bus bars 66 are connected to a current sensor 72 of the inverter system 54 for electrically coupling the inverter system 54 to the electric motor 22.

Coupling the inverter system 54 to the electric motor 22 can be challenging depending on how these components are packaged relative to one another within the electrified vehicle 12. For example, when the inverter system 54 is positioned perpendicular to a centerline of the motor stator 62, such as shown in FIGS. 2-4, a 90 degree route of the terminal block assembly 58 and the bus bars 66 is required to achieve the connection. Various terminal block assemblies are described below that have been designed with these challenges in mind.

Figure 5:
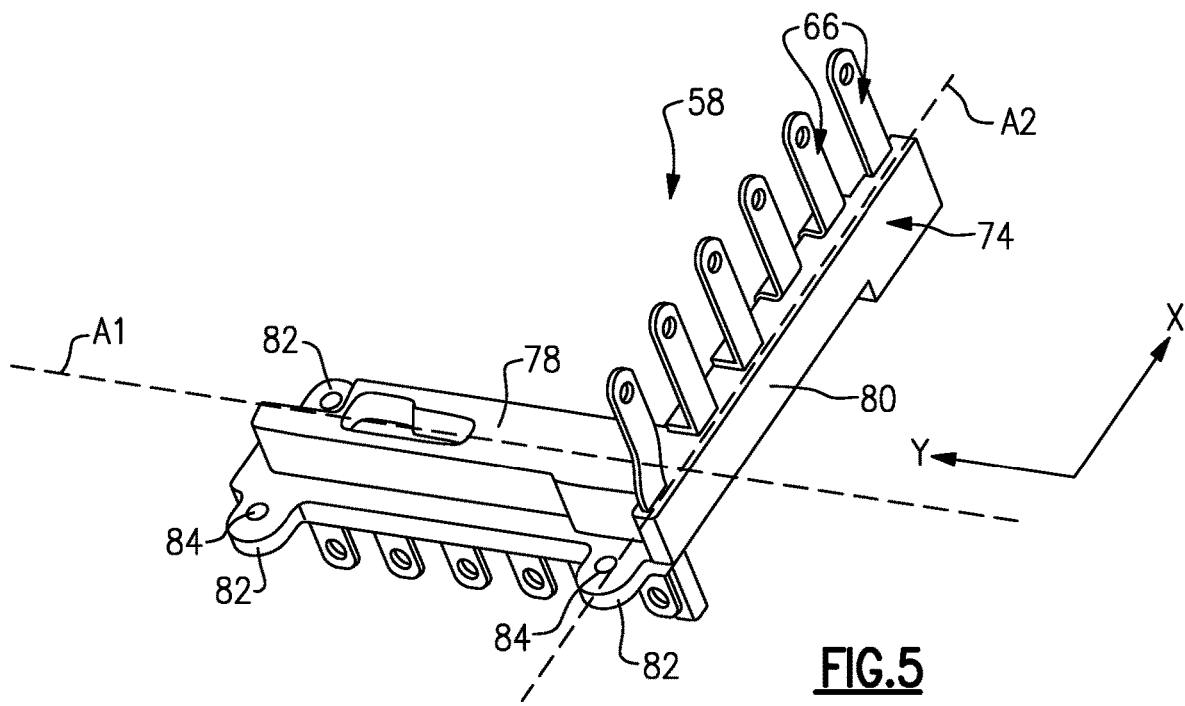
FIGS. 5, 6, and 7 illustrate a terminal block assembly according to a first embodiment of this disclosure.
Figure 6:
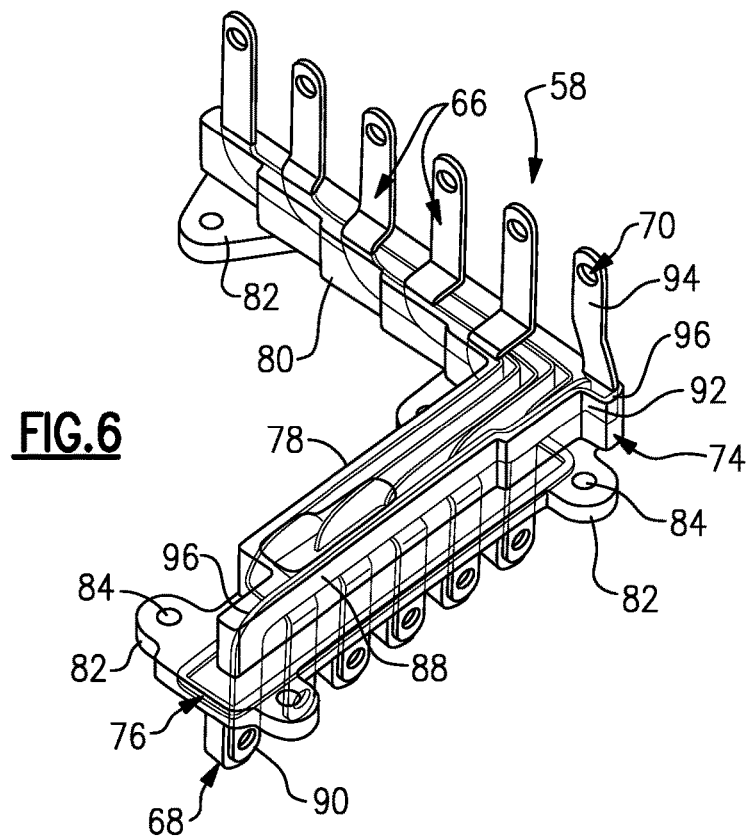
Figure 7:
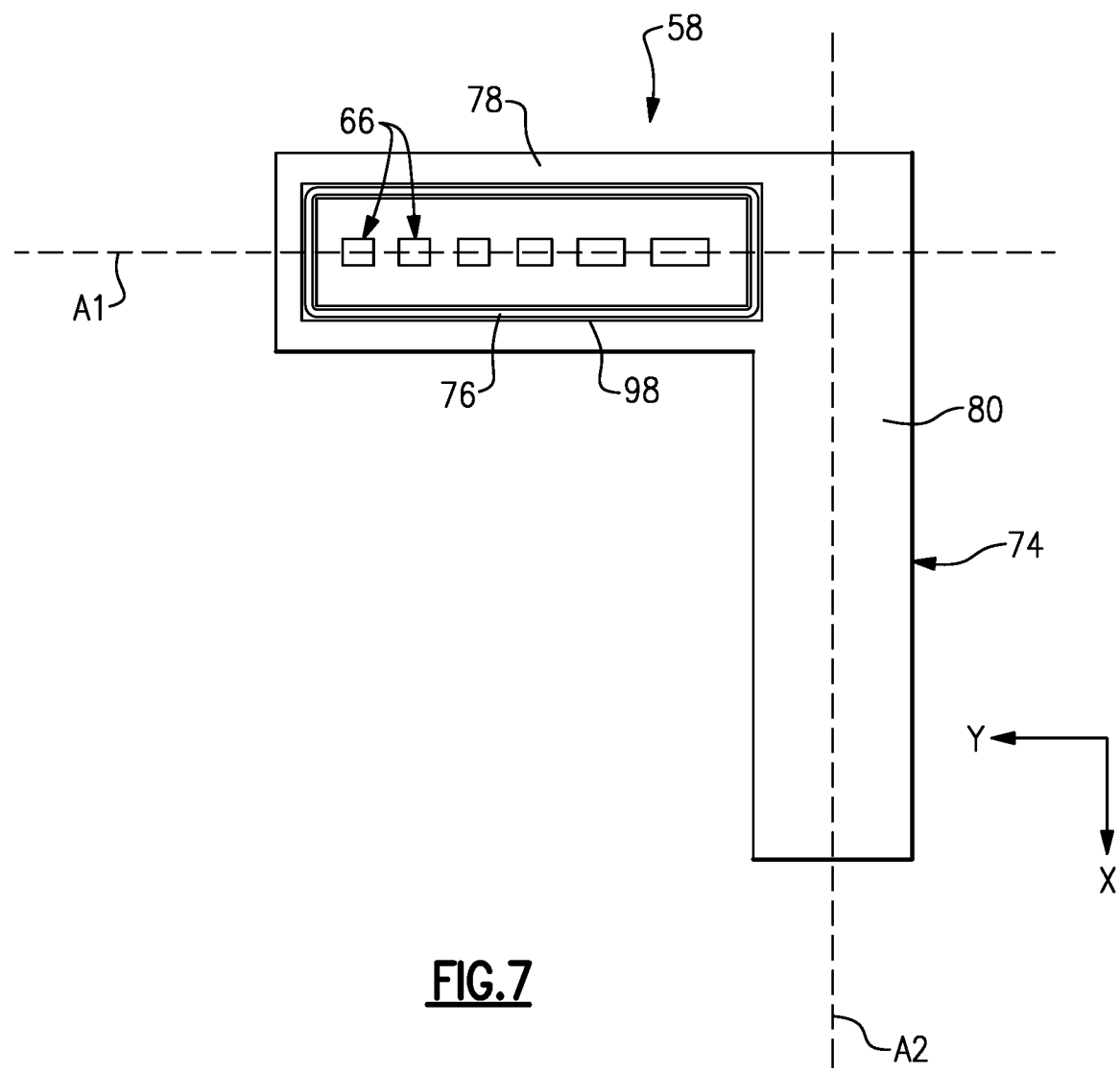

FIGS. 5-7, with continued reference to FIGS. 2-4, illustrate an exemplary terminal block assembly 58 of the power system 56 described above. The terminal block assembly 58 includes a housing 74, a plurality of bus bars 66, and a seal 76.

The housing 74 of the terminal block assembly 58 includes a first housing section 78 and a second housing section 80. The second housing section 80 is integral with the first housing section 78 to establish a monolithic, polymeric structure.

The first housing section 78 extends along a first longitudinal axis A1 (disposed along the y-axis of a Cartesian coordinate system in this example) and the second housing section 80 extends along a second longitudinal axis A2 (disposed along the x-axis of a Cartesian coordinate system in this example). In a non-limiting embodiment, the first longitudinal axis A1 and the second longitudinal axis A2 are transverse to one another. In yet another non-limiting embodiment, the first longitudinal axis A1 and the second longitudinal axis A2 are perpendicular to one another.

Each of the first housing section 78 and the second housing section 80 may include one or more mounting tabs 82. Each mounting tab 82 includes an opening 84 sized to receive a fastener 86 for mounting the terminal block assembly 58 to the surface 64 of the motor housing 60 (see, for example, FIG. 3).

In a non-limiting embodiment, the housing 74 is overmolded around the bus bars 66. The bus bars 66 may establish a circuitous route through the first housing section 78 and the second housing section 80 of the housing 74 for achieving a desired connection between the electric motor 22 and the inverter system 54. For example, as best shown in the phantom view of FIG. 6, each bus bar 66 may include a first section 88 that extends in parallel with the first longitudinal axis A1 of the first housing section 78, a second section 90 that protrudes outside of the first housing section 78 and extends transverse to the first longitudinal axis A1, a third section 92 that extends in parallel with the second longitudinal axis A2 of the second housing section 80, and a fourth section 94 that protrudes outside of the second housing section 80 and extends transverse to the second longitudinal axis A2. The second sections 90 establish the first end portions 68 of the bus bars 66 which connect to the motor stator leads 67 of the electric motor 22, and the fourth sections 94 establish the second, opposite end portions 70 of the bus bars 66 which connect to the current sensor 72 of the inverter system 54. In a non-limiting embodiment, the first housing section 78 of the housing 74 and the bus bars 66 are arranged such that the first end portions 68 of the bus bars 66 are positioned in a horizontal row for achieving connection to the electric motor 22.

Each bus bar 66 may include one or more bends 96 for establishing the circuitous route inside the housing 74. In a non-limiting embodiment, each bus bar 66 includes three bends 96: a first bend between the first section 88 and the second section 90, a second bend between the first section 88 and the third section 92, and a third bend between the third section 92 and the fourth section 94. In another non-limiting embodiment, the bends 96 position the sections of the bus bars 66 at about 90 degrees relative to one another.

The configuration of the housing 74 and the bus bars 66 in the manner described above enables the electric motor 22 and the inverter system 54 to be electrically coupled in a simple and reliable manner even where the inverter system 54 is perpendicular to a centerline of the motor stator 62 the electric motor 22.

The seal 76 is adapted to seal the inverter system 54 from the wet environment of the motor stator 62 of the electric motor 22. The seal 76 may be a surface seal, such as a gasket seal, or any other type of seal. In a non-limiting embodiment, the seal 76 is received within a recessed groove 98 (best shown in FIG. 7) formed in the portion of the housing 74 that interfaces with the wet environment of the electric motor 22 (in this case, the first housing section 78 of the housing 74). Once the terminal block assembly 58 has been mounted to the electric motor 22, the seal 76 is sandwiched between the surface 64 of the motor housing 60 and the housing 74 to substantially block fluids from being communicated from the wet environment of the motor stator 62 to the dry environment of the inverter system 54.

Figure 8:
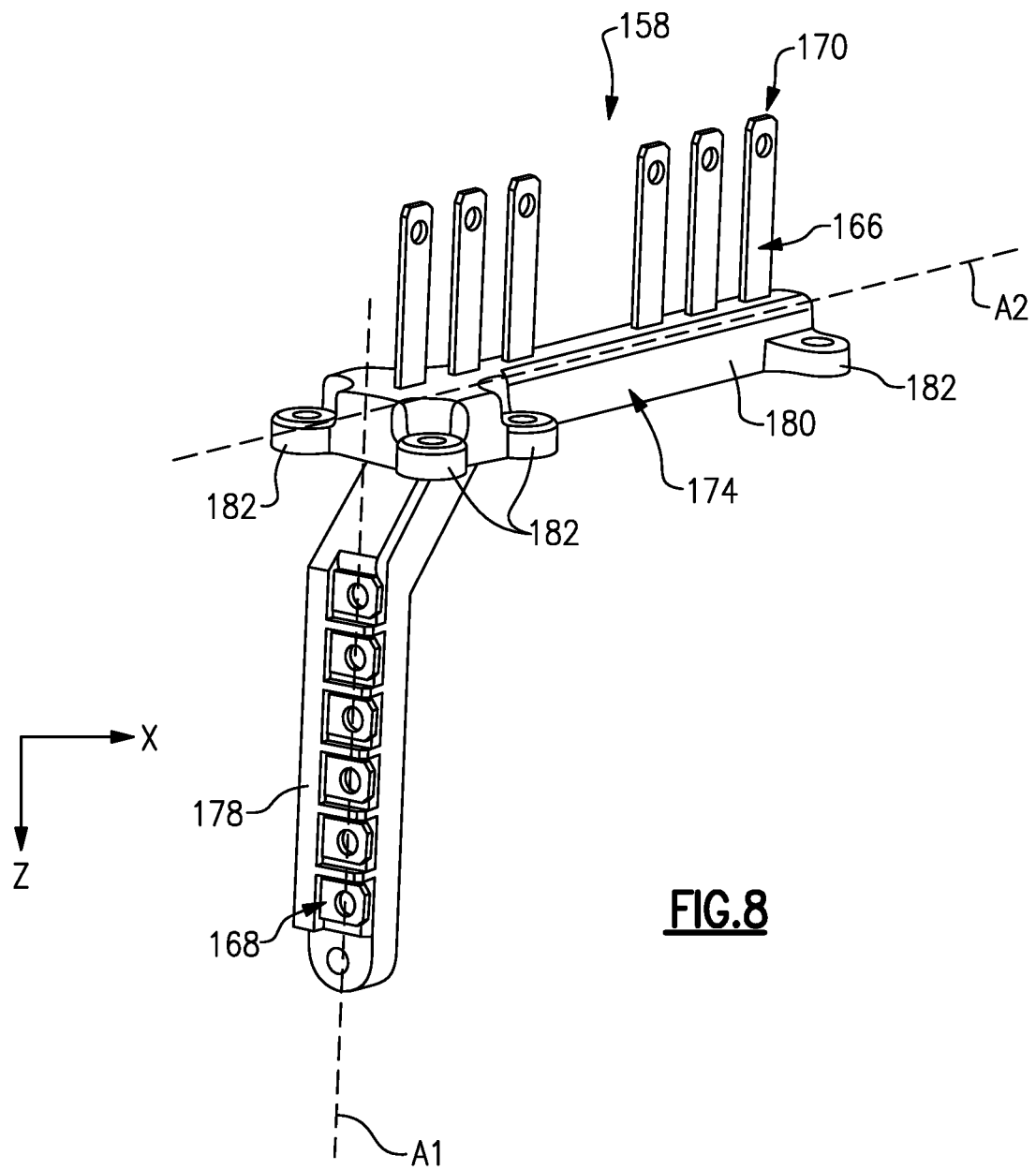
FIGS. 8 and 9 illustrate a terminal block assembly according to another embodiment of this disclosure.
Figure 9:
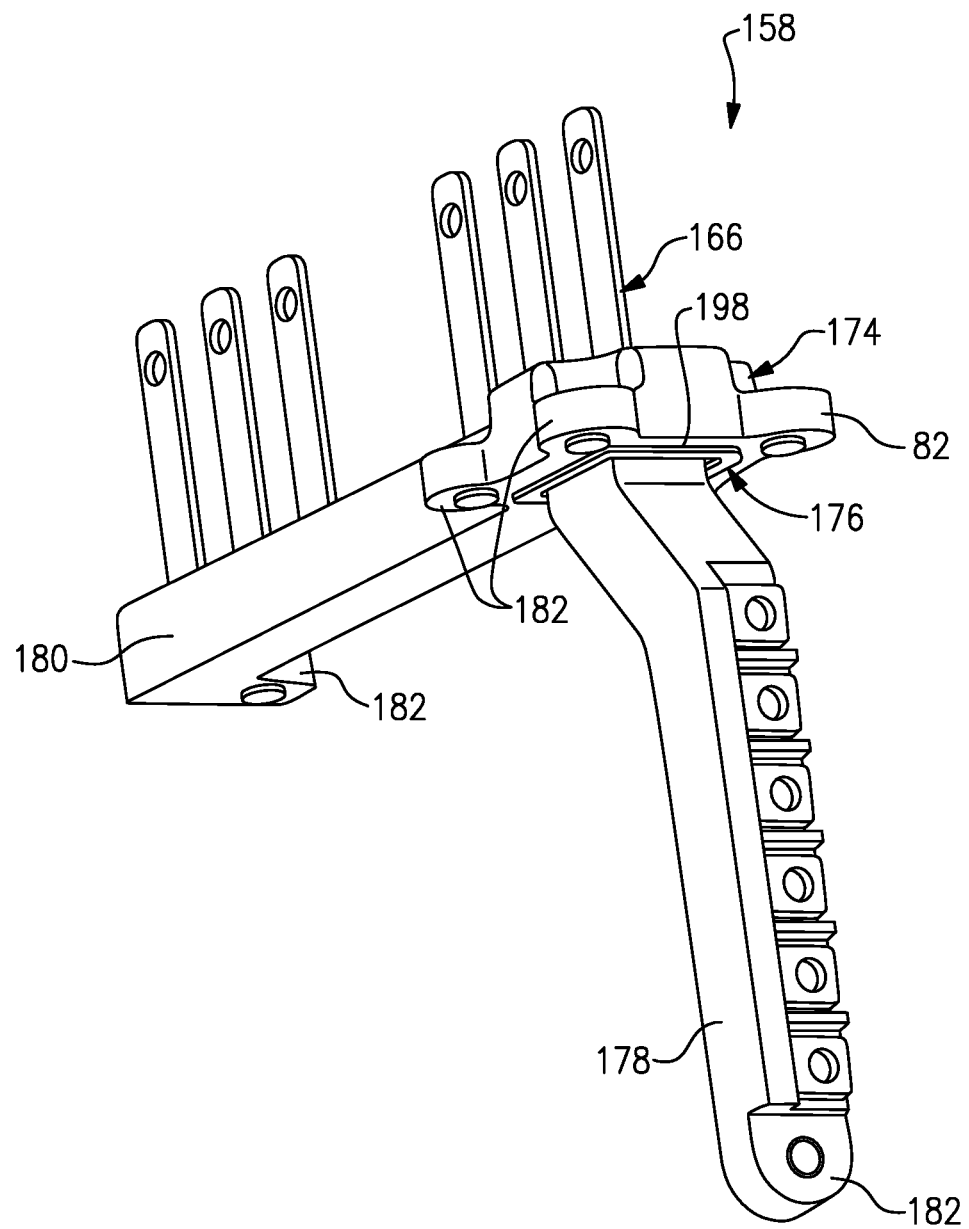

FIGS. 8 and 9 illustrate another exemplary terminal block assembly 158. The terminal block assembly 158 is similar to the terminal block assembly 58 described above except that a housing 174 of the terminal block assembly 158 is configured differently to accommodate a different packaging arrangement between the electric motor 22 and the inverter system 54, or between any other electrical components of the electrified vehicle in which AC power is carried between the components.

In this embodiment, the terminal block assembly 158 includes the housing 174 and a seal 176 (see FIG. 9). The housing 174 includes a first housing section 178 extending along a first longitudinal axis A1 (disposed along a z-axis) and a second housing section 180 extending along a second longitudinal axis A2 (disposed along an x-axis). The first longitudinal axis A1 and the second longitudinal axis A2 may be transverse or even perpendicular to one another. Each of the first housing section 178 and the second housing section 180 may include one or more mounting tabs 182 for mounting the terminal block assembly 158.

A plurality of bus bars 166 are arranged to follow a circuitous route inside the housing 174. Each bus bar 166 includes a first end portion 168 and a second, opposite end portion 170 that protrude outwardly from the first housing section 178 and the second housing section 180, respectively. The first end portions 168 connect to the electric motor 22, and the second, opposite end portions 170 connect to the current sensor 72 of the inverter system 54. In a non-limiting embodiment, the first housing section 178 of the housing 174 and the bus bars 166 are arranged such that the first end portions 168 of the bus bars 166 are positioned in a vertical row as opposed to the horizontal row established by the exemplary terminal block assembly 58 of FIGS. 5-7. It should be understood that other configurations, including but not limited to radial orientations relative to the motor stator or any other orientation that resolves overall packaging constrains, are also contemplated within the scope of this disclosure.

The seal 176 is adapted to seal the inverter system 54 from the wet environment of the motor stator 62 of the electric motor 22. In a non-limiting embodiment, the seal 176 is received within a recessed groove 198 (best shown in FIG. 9) formed in the second housing section 180. The recessed groove 198 circumscribes the first housing section 178, in a non-limiting embodiment. Once the terminal block assembly 158 has been mounted to the electric motor 22, the seal 176 is sandwiched between the motor housing 60 and the housing 174 to substantially block fluids from being communicated from the wet environment of the motor stator 62 to the dry environment of the inverter system 54.

Figure 10:
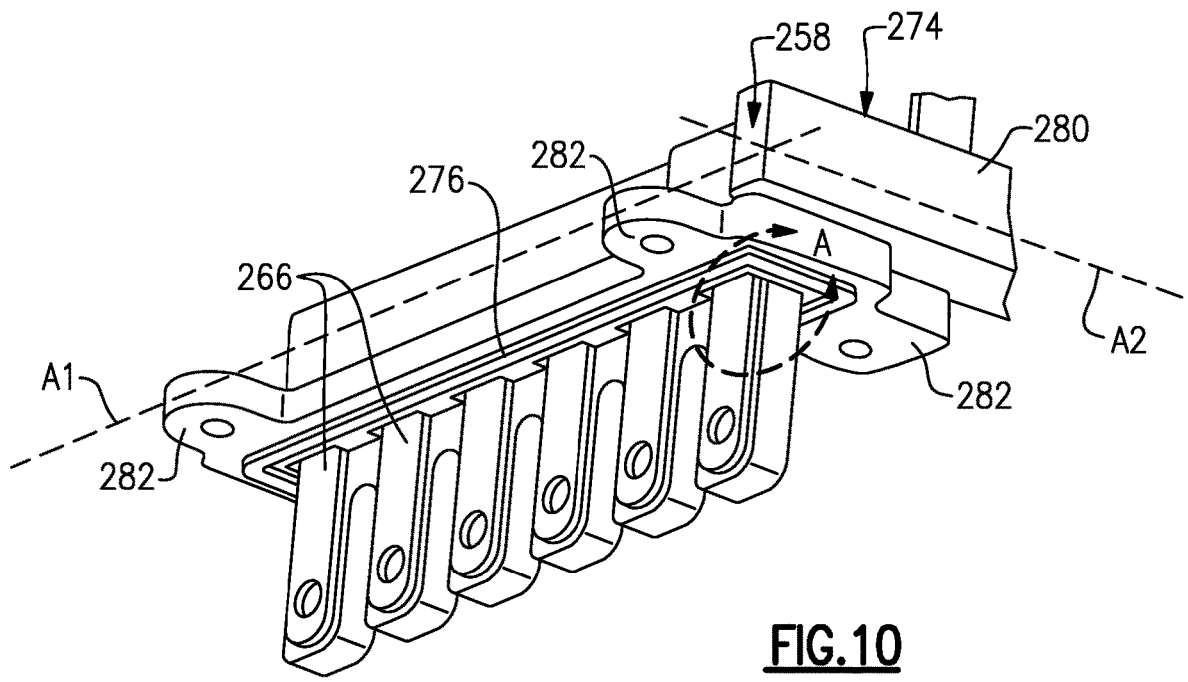
FIGS. 10 and 11 illustrate a terminal block assembly according to yet another embodiment of this disclosure.
Figure 11:
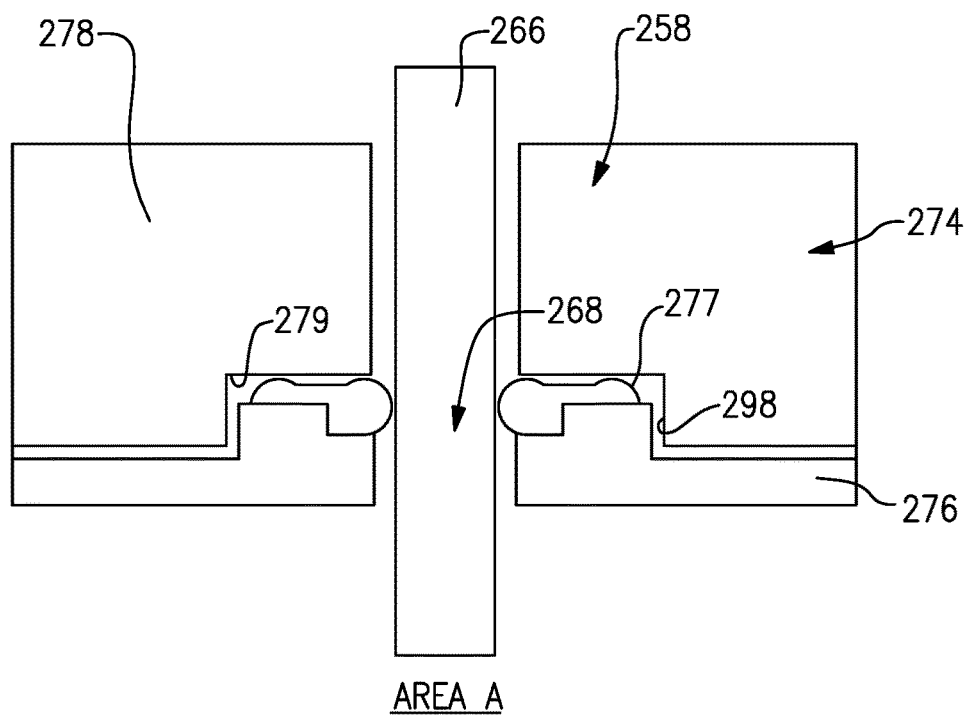

FIGS. 10 and 11 illustrate yet another terminal block assembly 258. FIG. 10 is a perspective view of portions of the terminal block assembly 258, whereas FIG. 11 is a sectional view of Area A of FIG. 10.

The terminal block assembly 258 includes a housing 274, a plurality of bus bars 266, a first seal 276, and a plurality of second seals 277. As explained in greater detail below, the first seal 276 and the second seals 277 cooperate to seal a dry environment of the inverter system 54 from a wet environment of the electric motor 22.

The housing 274 of the terminal block assembly 258 includes a first housing section 278 extending along a first longitudinal axis A1 and a second housing section 280 extending along a second longitudinal axis A2. The second housing section 280 is integral with the first housing section 278 to establish a monolithic structure. In a non-limiting embodiment, the first longitudinal axis A1 and the second longitudinal axis A2 are transverse to one another. In yet another non-limiting embodiment, the first longitudinal axis A1 and the second longitudinal axis A2 are perpendicular to one another. Each of the first housing section 278 and the second housing section 280 may additionally include one or more mounting tabs 282.

In a further non-limiting embodiment, the bus bars 266 are snap fit into the housing 274. Each of the first and second housing sections 278, 280 may include various features for receiving and holding the bus bars 266.

The bus bars 266 may extend along a circuitous route through the first housing section 278 and the second housing section 280 for achieving a desired connection between the electric motor 22 and the inverter system 54. The configuration of the housing 274 and the bus bars 266 enables the electric motor 22 and the inverter system 54 to be electrically coupled in a simple and reliable manner even when the inverter system 54 is packaged perpendicular to a centerline of the motor stator 62 the electric motor 22.

Referring now primarily to FIGS. 10 and 11, the first seal 276 and the second seals 277 cooperate to seal the inverter system 54 from the wet environment of the motor stator 62 of the electric motor 22. In a non-limiting embodiment, the first seal 276 is a surface seal and the second seals 277 are formed seals. In another non-limiting embodiment, the second seals 277 are made of a potting material, which may be plastic or some similar performing material. However, other seal types may also be suitable. Non-limiting examples of suitable sealing materials include silicone rubber (i.e., room temperature vulcanization (RTV) silicone), acrylic rubber, or any other similar elastomer.

One of the second seals 277 is received around a first end portion 268 of each bus bar 266 that protrudes outwardly of the first housing section 278. The second seals 277 are received between a sealing surface 279 of the first housing section 278 and the first seal 276. In this way, the first seal 276 acts as a cover of the second seals 277 in addition to providing additional sealing.

The first seal 276 may be received within a recessed groove 298 formed in the portion of the housing 274 that interfaces with the wet environment of the electric motor 22 (in this case, the first housing section 278 of the housing 274). Once the terminal block assembly 258 has been mounted to the electric motor 22, the first seal 276 and the second seals 277 are sandwiched between the surface 64 of the motor housing 60 and the housing 274 to substantially block fluids from being communicated from the wet environment of the motor stator 62 to the dry environment of the inverter system 54.

The terminal block assemblies of this disclosure provide simple and reliable electrical connections between components operating on heavy electrical currents within electrified vehicles. The proposed terminal block assemblies are additionally equipped to seal wet environments from dry environments within power systems operating over alternating current buses.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
    an electric motor;
    an inverter system; and
    a terminal block assembly adapted to electrically couple the electric motor and the inverter system,
    wherein the terminal block assembly includes a housing, a plurality of bus bars, and a first seal adapted to seal the inverter system from a wet environment of the electric motor,
    wherein the housing includes a first housing section extending along a first longitudinal axis and a second housing section extending along a second longitudinal axis,
    wherein each of the plurality of bus bars includes a first section extending in parallel with the first longitudinal axis, a second section that protrudes outside of the first housing section and is perpendicular to the first longitudinal axis, a third section that extends in parallel with the second longitudinal axis, and a fourth section that protrudes outside of the second housing section and is perpendicular to the second longitudinal axis,
    wherein the second sections connect to a motor stator lead of the electric motor and the fourth sections connect to a current sensor of the inverter system.

2. The electrified vehicle as recited in claim 1, comprising a second seal received around each of the second sections of the plurality of bus bars, wherein the second seals are received between a sealing surface of the first housing section and the first seal such that the first seal covers the second seals.

* * * * *